(12) United States Patent
Edmond

(10) Patent No.: US 7,442,118 B2
(45) Date of Patent: *Oct. 28, 2008

(54) APPARATUS DESIGNED FOR THE FILETING OF FISH

(76) Inventor: Jay Jeffrey Edmond, 141 Bayshore, Amarillo, TX (US) 79118

( * ) Notice: Subject to any disclaimer, the term of this patent is extended or adjusted under 35 U.S.C. 154(b) by 0 days.

This patent is subject to a terminal disclaimer.

(21) Appl. No.: 11/746,456

(22) Filed: May 9, 2007

(65) Prior Publication Data

US 2008/0166961 A1 Jul. 10, 2008

Related U.S. Application Data

(63) Continuation-in-part of application No. 11/651,666, filed on Jan. 10, 2007, now Pat. No. 7,322,573.

(51) Int. Cl.
*A22C 25/06* (2006.01)

(52) U.S. Cl. ..................................... 452/196

(58) Field of Classification Search ............ 269/289 R, 269/302.1, 16, 900; 452/185, 194–196, 198
See application file for complete search history.

(56) References Cited

U.S. PATENT DOCUMENTS

| | | | | |
|---|---|---|---|---|
| D159,881 S | * | 8/1950 | Zekowski ................ | D7/698 |
| 2,609,024 A | * | 9/1952 | Russ ....................... | 269/15 |
| 3,248,751 A | * | 5/1966 | Wilborn ................... | 452/195 |
| 3,598,164 A | * | 8/1971 | August .................... | 269/13 |
| 3,785,008 A | * | 1/1974 | Parker ..................... | 452/195 |
| D283,777 S | * | 5/1986 | Morin ..................... | D7/698 |
| 4,653,737 A | * | 3/1987 | Haskins et al. ............ | 269/13 |
| 4,840,361 A | * | 6/1989 | Richter ................... | 269/289 R |
| 5,363,755 A | * | 11/1994 | Liang ..................... | 99/484 |
| 5,366,208 A | * | 11/1994 | Benjamin ................ | 269/13 |
| 5,423,451 A | * | 6/1995 | Snyder ................... | 220/574 |
| 5,474,494 A | * | 12/1995 | Sims ...................... | 452/194 |
| 5,865,105 A | * | 2/1999 | Pepelanov ............... | 99/446 |
| 5,938,185 A | * | 8/1999 | Kletter ................... | 269/289 R |
| D472,776 S | * | 4/2003 | Porter .................... | D7/698 |

* cited by examiner

*Primary Examiner*—Thomas Price
(74) *Attorney, Agent, or Firm*—Charles D. Gunter, Jr.

(57) ABSTRACT

An apparatus and method are shown for fileting fish. The apparatus includes a retaining pan and a pair of support elements capable of spanning the width of the pan interior by attachment to the opposing outer edges of the pan. The support elements have retaining elements which are used to securely affix a cutting board to the support elements. Once assembled, the cutting board creates an ideal location to filet a fish while allowing the fluids discharged from the fish to flow over the edges of the board and collect into the surrounding retaining pan.

8 Claims, 4 Drawing Sheets

APPARATUS DESIGNED FOR THE FILETING OF FISH

CROSS-REFERENCE TO RELATED APPLICATIONS

The present application is a continuation-in-part of Applicant's prior U.S. application, Ser. No. 11/651,666, filed Jan. 10, 2007, now U.S. Pat. No. 7,322,573 entitled "Apparatus Designed for the Filleting of Fish."

BACKGROUND OF THE INVENTION

1. Field of the Invention

The present invention relates generally to household cutting and carving boards and associated receptacles for receiving overflow or wastes associated with the task at hand and, more specifically, to a cutting board designed for filleting fish or cutting or carving other food items, which provides a stable, raised cutting area and which allows discharged fluids to flow over the edges of the board and be collected into a surrounding retaining pan.

2. Description of the Prior Art

Household cutting boards are frequently used accessories in the kitchen. They are generally made of wood, plastic or glass and provide a flat surface on which to cut or slice objects during the preparation of foods. For example, cutting boards are typically placed on a countertop or tabletop and used to cut fish, vegetables, fruits, meats, or various other food products for preparation of a meal.

Many people consider fish to be a staple of their diet. Once a fish is caught, or even bought, it is generally necessary to dress and cut the fish before preparing it to eat. A "filet" is one of the most common and popular cuts of fish in the United States. Preparation of the fish filet may involve scaling, gutting, removal of the head and tail, and the removal of the dorsal fin and bones, or some one or more of these cleaning steps. If performed correctly, the remaining meat may be cut into the desired filet to be cooked. During the dressing and filleting process, fluids are invariably discharged from the fish, creating a messy and unsightly environment in the kitchen or other work area. Although some dress and filet fish on a work area covered by newspaper, paper bags, or the like, others desire to dress and filet in a more controlled environment, such as one that a cutting board offers.

Electric filet knives are often used at the present time to speed up or simplify the filleting process. Ideally, the cutting board used with an electric filet knife should present a raised cutting surface some 2-3 inches above the table top which is sturdy and which does not slide in use.

A variety of cutting and filet boards are known in the prior art. For example, U.S. Pat. Nos. 3,248,751 and 3,785,008 are cited of interest in showing some older fish cleaning accessories. While mainly focused on the scaling aspect rather than the filleting, these inventions are exceedingly complex in design. The inventions contain clips, attachable parts, collapsible elements, leaf springs, and camming mechanisms among other components. Similarly complex designs are more likely to present mechanical problems with age and present an opportunity for more maintenance issues or replacement work.

Other examples of prior art consist of a more traditional cutting board design, with added openings that allow a waste container to be placed underneath the cutting board itself. For instance, U.S. Pat. No. 5,474,494 shows a fish cleaning board which includes an opening in the board surface leading to a receptacle mounted below the opening. This is a common theme, as evident in U.S. Des. Pat. No. 472,776, which shows a food preparation board with an opening in the upper surface, the opening communicating with a bowl which can be received beneath the bottom surface of the board. Furthermore, U.S. Pat. No. 4,840,361 teaches a board with a slightly sloped surface starting from the edge and bordering a juice channel on the opposite edge of the board.

Alternatively, several designs teach an apparatus with a waste or storage container provided in combination with the cutting board. U.S. Pat. No. 3,598,164 shows a cutting board with a receptacle which is received beneath the board. Similarly, U.S. Pat. Des. No. 283,777 shows a raised cutting board with an opening in the cutting surface which communicates with a bowl or pan located below the opening. U.S. Des. Pat. No. 159,881 shows a wooden cutting board with a juice receiver feature. The board also has an opening which communicates with a pan or bowl located on the lower surface of the board.

Not all designs integrate a generally rectangular shape of cutting board and receptacle. U.S. Pat. No. 5,423,451 shows a combined bowl and cutting board with the cutting board (17 in FIG. 1) being received within and supported on the mouth region of the bowl, thereby forming a circular cutting surface. Additionally, the food may be cut on the cutting surface and then be deposited into the serving bowl underneath, thereby eliminating the marking or cutting of the interior surface of the bowl that might occur if the user alternatively cut the food inside the bowl rather than atop the cutting board surface.

Many times, cutting boards constructed with collection receptacles are relatively inconvenient to use. U.S. Pat. No. 2,609,024 shows a fairly complicated cutting board arrangement with various slidable trays and an opening in the upper cutting surface. With similar designs, the collection well is generally limited in capacity and, as a result, often capable of filling and overflowing onto the cutting surface or underlying table long before the cutting operation has been completed. In addition, since the collection receptacle is fashioned as an integral portion of the board, it is difficult and messy to remove the collected liquid from the cutting board for cleaning purposes.

Despite the improvements represented by the prior art references discussed above, a need continues to exist for an improved cutting or filet board which provides a convenient cutting surface for cleaning or filleting fish or cutting meat or other food items, which also includes a combined receptacle for catching any fluid discharge or pieces of waste meat.

It is therefore an object of the present invention to provide a new and improved cutting board and receptacle combination which is simple in design and economical to manufacture.

It is a further objective of the present invention to provide such a device which is of durable and reliable construction, and which is easily carried or transported to a location of desired use.

Another object of the present invention is to provide a cutting board and receptacle combination wherein each of the components are separable and can be easily cleaned as required.

Another object is to provide such a cutting board assembly which is especially well adjusted for use with an electric filet knife, which provides a raised cutting surface and which is sturdy and will not slide or move about in use.

Another object is to provide a cutting board assembly with an upper surface suitably equipped with means for preventing food items from shifting or sliding while being cut.

SUMMARY OF THE INVENTION

The cutting aboard assembly of the invention includes a retaining pan, at least a pair of support elements, and a cutting board. The cutting board is preferably formed of a non-corrosive, synthetic material having an upper surface, a lower surface and peripheral edges. In the most preferred embodiment of the invention, the cutting board has opposed peripheral edges arranged at right angles to define a polygonal upper surface. The associated retaining pan has a bottom wall and associated upright retaining walls extending upwardly generally perpendicular thereto to define an initially open interior. The upright retaining walls form a continuous outer edge which terminates in a downwardly extending peripheral lip.

The first and second support elements each have a length, a width, and opposing ends, which together define an upper planar surface that terminates at either end thereof in a downwardly extending flange. The flange is sized to matingly engage the downwardly extending peripheral lip of the retaining pan to thereby secure the support element on the outer edge of the pan.

In one version of the invention, the first and second support elements each have an angle bracket located at opposing ends thereof, whereby each angle bracket forms a corner receiving region for receiving a corner of a cutting board. In another version of the invention, at least one of the first and second support elements has a vertical lip formed in the upper planar surface thereof, which lip is adapted to be engaged by a mating groove formed in the cutting board lower surface. The cutting board is secured to the support brackets by sliding the board onto the lip.

The previously described angle brackets and engagement lip allow the cutting board to be securely engaged in position above the top opening of the receptacle pan. The downwardly extending flanges also allow the support elements to be slidably or otherwise engaged on the retaining pan lip, whereby the position of the cutting board can be varied with respect to the pan open interior. However, once the support elements are adjusted in size to receive the particular cutting board to be used and are engaged on the retaining pan sidewalls, they remain positively engaged to the retaining pan and provide a secure surface for filleting cutting or other food dressing operations.

The first and second support elements support a cutting board above the pan open interior but are spaced apart from the pan edges to thereby create a gap between the pan edges and the cutting board that allows the draining of fluids from the cutting board surface into the pan interior. Since the support elements support the cutting board above the open pan interior in a generally horizontal plane, they add greater stability and control for the user. This is particularly true if the desired object to be cut is irregularly shaped or slippery and particularly difficult to hold.

In one form, the cutting board again has opposed peripheral edges arranged at right angles to define a polygonal upper and lower surface. The polygonal upper and lower surfaces each have a length, a width, and a separating intermediate thickness. A plurality of pointed upright elements protrude from the polygonal upper surface and are capable of receiving and securing foodstuffs to the upper surface of the cutting board during cutting operations.

The present invention also teaches a method of using a cutting board assembly to filet a fish. Once the above described cutting board assembly has been provided, the cutting board is secured to the pan by clipping the support element flanges over the peripheral lip of the pan and then placing the cutting board on the support elements and securing the board to the pan. The user can slide the support elements along the sides of the retaining pan in order to fit the appropriate size of the cutting board. Next, a fish is placed on the upper surface of the cutting board, thereby allowing a user to dress the fish and allowing any fluids which are discharged to flow over the cutting board and through the gap which is formed between the cutting board peripheral edges and the pan edges when the cutting board is engaged on the support elements. Additionally, the gap can be varied by sliding the cutting board to a different relative position on the pan edges. Where the cutting board is provided with the pointed upright elements, these elements can be used to assist in securing foodstuffs to the upper surface of the cutting board during cutting operations. This might be especially helpful in cutting larger cuts of meat, such as a roast.

Once the cutting, dressing or filet processes are complete, the cutting board assembly can be easily cleaned by simply removing the cutting board from the associated receptacle pan. The cutting board may be lifted clear, and is then ready to be washed in the appropriate manner. Next, the support elements may slide along the pan edges until the flanges are disengaged from the peripheral lip at the corners of the pan. In addition, the waste materials collected in the retaining pan may be disposed of in whatever manner the user sees fit, and then the pan may then proceed to the cleaning stage along with the board.

Additional objects, features and advantages will be apparent in the written description which follows.

DETAILED DESCRIPTION OF THE INVENTION

The cutting board assembly of the invention will now be described with reference to the accompanying drawing figures. While the invention will be described in terms of the preferred embodiment of a fish filleting cutting board, it will be understood that the apparatus of the invention could also be used for a variety of other related kitchen tasks, such as cutting or carving vegetables, fruits and other meats besides fish. The retaining pan may be used to hold the finished cuttings, for example, of various vegetables to be used in a salad.

Figure 1:
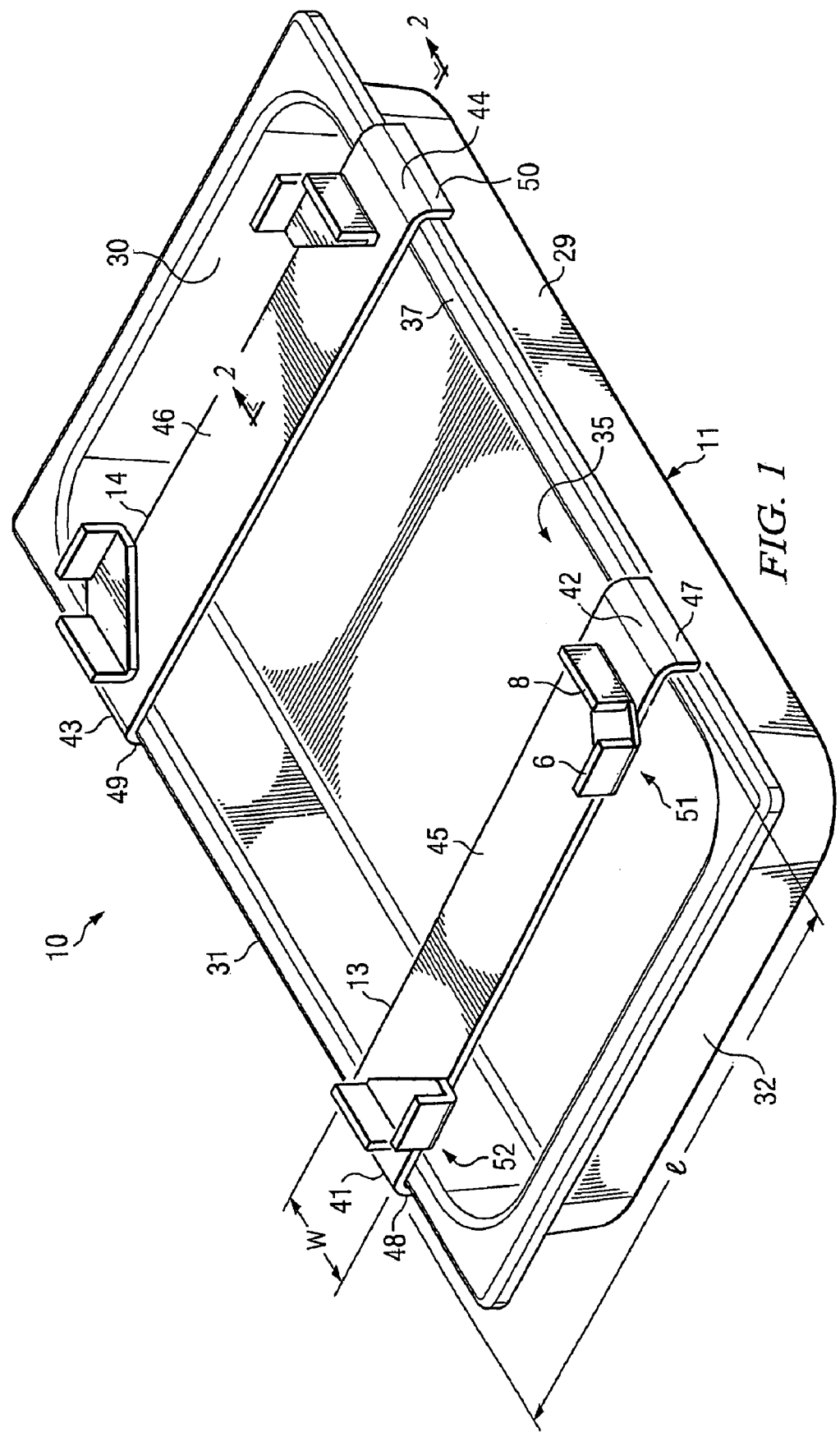
FIG. 1 is a perspective view of the retaining pan and cutting board assembly of the invention showing the support elements in place on the lips of the retaining pan sidewalls.

Turning now to FIG. 1, there is shown a cutting board assembly of the invention, designated generally as 10. The cutting board assembly includes a retaining pan 11, at least a pair of support elements 13, 14 and a cutting board 15 (see FIG. 3A).

The cutting board 15 has opposed peripheral edges 17, 18, 19, 20, the adjacent edges being arranged at right angles to define a polygonal upper surface 23 and a lower surface 25. In the preferred embodiment of the present invention, the cutting board 15 is formed of a non-corrosive synthetic material, such as a suitable plastic, PVC, polystyrene, etc. While the cutting board itself is conveniently formed of a synthetic "plastic" type material, the associated retaining pan 11 and support elements 13, 14 are preferably formed of a suitable corrosion resistant metal, such as stainless steel. This combination of materials provides a cutting board assembly which is ideally adapted for the convenient dressing and filleting of fish or other food items. The cutting board upper surface 23 provides an ideal surface to handle fish, while any fluids being discharged during the process may flow past the edges 17, 18, 19, 20 of the cutting board 15 and into the interior of the surrounding retaining pan 11.

Figure 2:
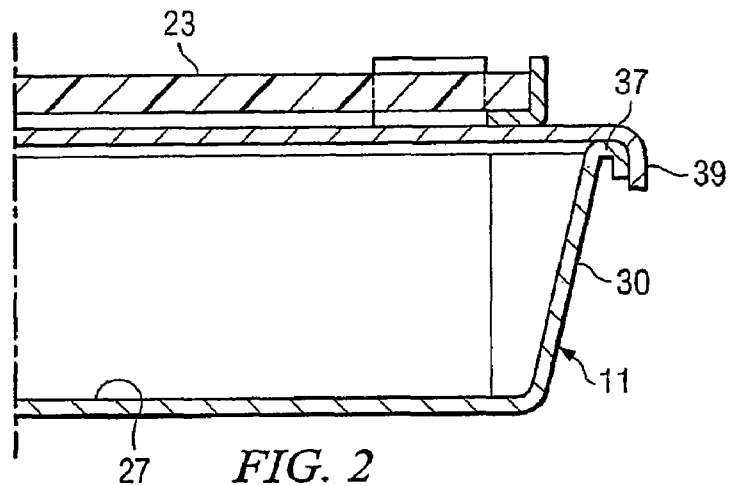
FIG. 2 is a partial cross-sectional view of the pan and cutting board with one of the support element flanges being shown in phantom lines for ease of illustration.

As shown in FIGS. 1 and 2, the retaining pan 11 has a bottom wall 27 and associated upright retaining walls 29, 30, 31, 32 extending upwardly generally perpendicular thereto to define an initially open interior 35 (FIG. 1). The top opening of the pan which is formed by the open interior 35 is sized at least slightly larger than the top surface area of the cutting board 15 on at least one side edge thereof to allow the drainage of fluids or other wastes.

As can be seen with regard to FIGS. 1 and 2, the upright retaining walls 29, 30, 31, 32 of the pan form a continuous outer edge 37 which terminates in a downwardly extending peripheral lip 39. The peripheral lip 39 is used as a convenient and sturdy location to attach the associated support elements 13, 14 (see FIG. 1). As has been discussed, the primary purpose of the retaining pan 11 is to collect waste byproducts from the dressing and filleting process that occurs on the upper surface 23 of the cutting board 15. However, in other embodiments of the present invention, the retaining pan 11 may be used to temporarily hold cut products, such as vegetables, while the user continues to use the cutting board until the cutting process is finalized.

As best seen in FIG. 1, the first support element 13 has a length "l", a width "w", and opposing ends 41, 42, which together define an upper planar surface 45 that terminates at either end thereof in downwardly extending flanges 47, 48. As mentioned briefly, the flanges 47, 48 are sized to be matingly engaged with the downwardly extending peripheral lip 39 of the retaining pan 11 to thereby secure the support elements 13, 14 on the outer edge 37 of the pan 11.

The support elements 13, 14 may be configured in various ways to securely engage the cutting board and support the cutting board above the retaining pan. For example, as shown in FIG. 1, the support element 13 is provided with a pair of angle brackets 51, 52, with one of the brackets being located adjacent each of the opposing ends 41, 42, respectively. Each of the angle brackets includes opposing upright elements 6, 8, arranged generally perpendicular to each other, and separated by a slight gap (see FIG. 1). The angle brackets 51, 52 form a corner receiving region for receiving a respective corner of a cutting board 15.

Figure 3A:
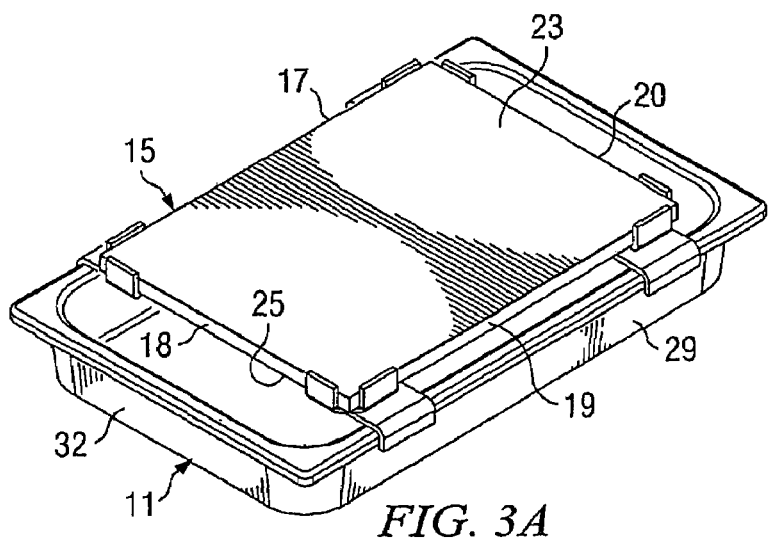
FIG. 3A is a perspective view of the retaining pan and cutting board assembly of the invention showing a first size cutting board in place on the support elements thereof.
Figure 3B:
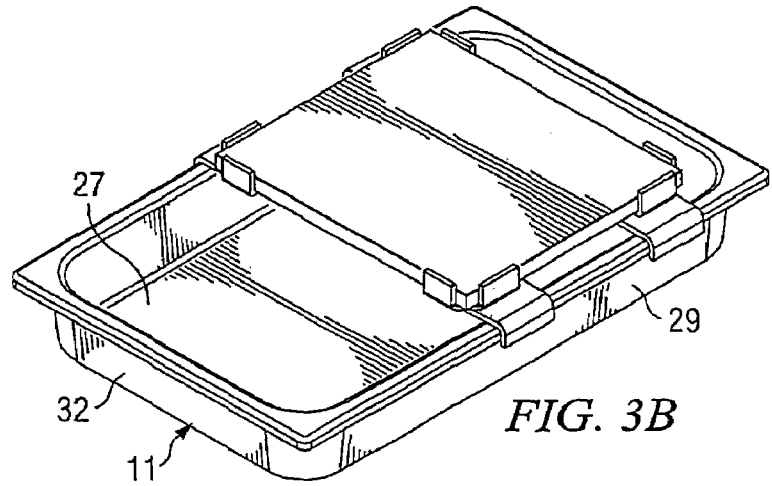
FIG. 3B is a view similar to FIG. 3A, but showing a second size cutting board in place on the support elements of the assembly.

As shown in FIGS. 3A and 3B, with the corners of the cutting board 23 received within the gap presented by the angle brackets and engaged within the upright elements 6, 8, the cutting board is securely engaged on the top of the receiving pan. Similarly, the second support element 14 also having a length, a width, and opposing ends 43, 44, which together define an upper planar surface terminating at either end thereof in downwardly extending flanges 49, 50 which are also sized to matingly engage the downwardly extending peripheral lip 39 on the retaining pan 11. The second support element 14 is also equipped with angle brackets 53, 54, as previously described with respect to the support element 13. The angle brackets 53, 54 also form a corner receiving region for receiving a corner of a cutting board 15.

It will be appreciated that the first and second support elements 13, 14 are designed in such a way that they may be positively engaged on the peripheral lip of the retaining pan. This occurs by applying downward pressure on the downwardly extending flanges 47, 48, 49, 50 after they are placed directly above the peripheral lip 39 or the retaining pan 11. Once the first and second support elements 13, 14 are attached to the retaining pan 11, the flanges 47, 48, 49, 50 are securely engaged on the pan sidewalls, providing an extremely sturdy location to place the cutting board 15. It will also be appreciated that the support elements can be installed by the user at any of a number of selected locations along the respective peripheral edges of the pan, whereby cutting boards of different lengths may be received on the retaining pan sidewalls. For example, FIGS. 3A and 3B show two different length cutting boards received on the respective receiving pans.

The first and second support elements 13, 14 therefore support a cutting board 15 above the pan open interior 35 but spaced apart from the pan edges 37 to thereby create a gap between the pan edges 37 and the cutting board edges 17, 18, 19, 20 to allow the draining of fluids from the cutting board 15 to the retaining pan 11 interior 35. Also, the support elements 13, 14 may slide along the peripheral lip 39 in order to change the size or location of the gap between the edges 17, 18, 19, 20 of the cutting board 15 and the retaining pan 11.

Figure 4:
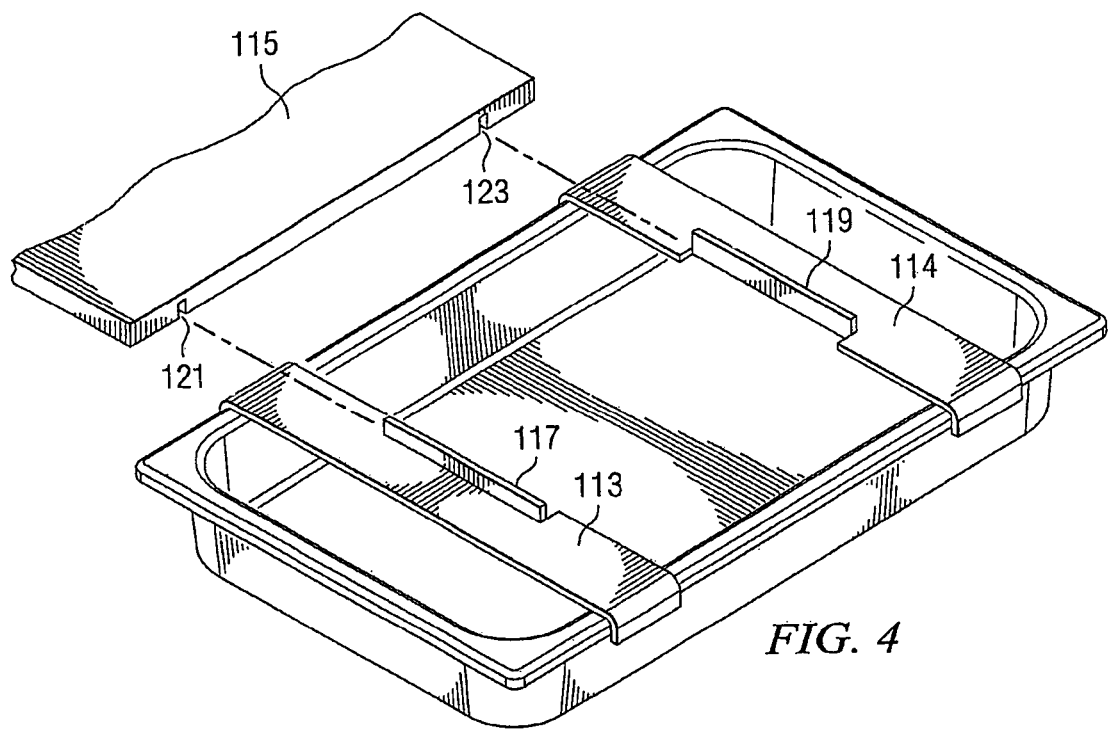
FIG. 4 is a view of another version of the invention, in which the support elements are provided with retaining lips for securing the cutting board.

FIG. 4 shows another version of the invention in which at least a selected one of the support elements 113, 114 is provided with a vertical lip for engaging a mating groove provided in the lower surface of the cutting board 115. Preferably, each of the support elements 113, 114 is provided with an upright lip 117, 119, for engaging a mating groove 121, 123, respectively, provided in the cutting board. The cutting board 115 is easily engaged on the support elements by sliding the board in the direction of the arrows shown in FIG. 4. The vertical lips 117, 119 can be formed easily and economically by cutting and bending, or stamping out the lips, from the material of the support elements, where the elements are formed of a lightweight metal.

Figure 6:
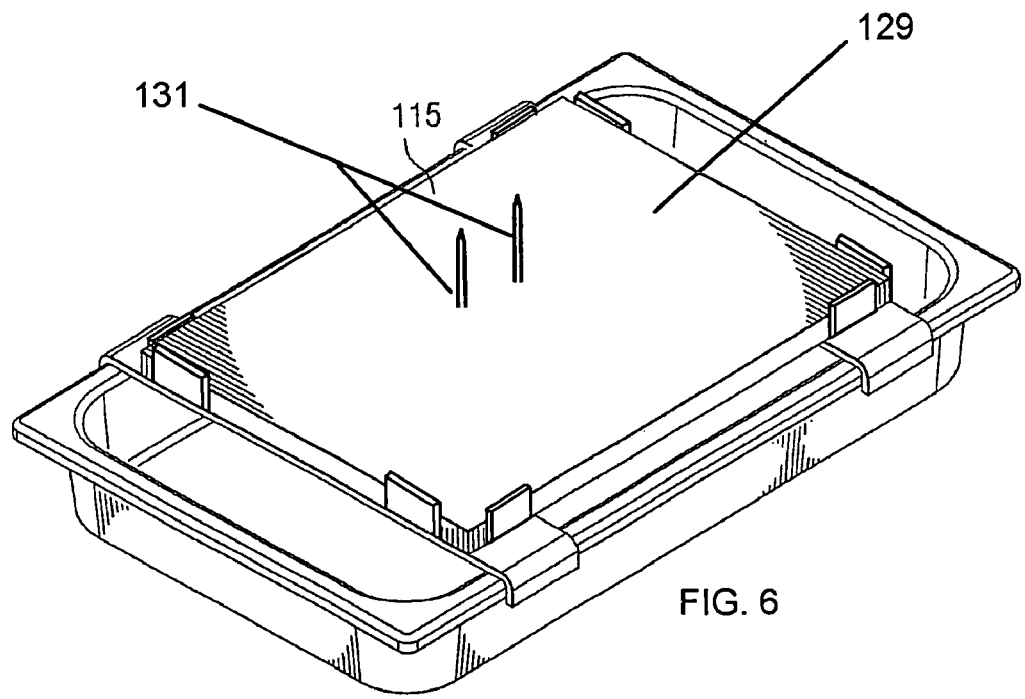
FIG. 6 is a perspective view of the retaining pan and cutting board assembly, including the protruding upright elements.

FIG. 6 illustrates yet another version of the invention in which the cutting board 115 again has an upper planar surface 129, an oppositely arranged lower planar surface and a separating intermediate thickness. A plurality of upright elements 131, in the form of spikes or nails, protrude through the upper planar surface 129 of the cutting board 115, preferably terminating in a relatively sharp point. While at least two such upright elements are preferred, it will be understood that more than two elements can be utilized, if desired. The plurality of upright elements 131 may be spaced slightly apart, such as shown in FIG. 6. The upright elements 131 are capable of receiving and securing foodstuffs to the upper surface 129 of the cutting board 115. For example, a user may impale a meat in order to secure the meat atop the cutting board 115 while carving without the use of an additional hand or fork. The impaled meat could easily be transported while atop the cutting board 115, i.e. from a kitchen to an outdoor grill, while preventing the meat from sliding or falling off the upper planar surface 129. Furthermore, a vegetable or fruit, such as a watermelon, may be impaled on the nails to prevent any rolling motion off the board. In applications where the upright elements 131 are not necessary, the user may simply "flip" the board 115 over to effectively place the upright elements 131 within the confines of the retaining pan and proceed to use the cutting board 115 as described in previous embodiments.

In each version of the invention illustrated in the drawings, the cutting board 15 is supported above the pan open interior 35 in a generally horizontal plane. The flat surface 23 provides extra stability in the case of cutting difficult or hard to handle objects. A flat cutting surface also tends to act to minimize the rolling or sliding of the object being handled during the cutting process. However, it will be appreciated that the cutting board 15 could also be supported above the pan open interior 35 at an inclined angle by merely modifying the angle brackets located at one end of the support elements. In this way, the discharged fluids are predisposed to flow in the downward direction of the slope, further assisting the removal of waste from the cutting board surface 23. This type design might be helpful in especially messy cutting operations, where fluid discharge is at a maximum.

As illustrated with respect to FIGS. 3A and 3B, the cutting board assembly of the invention could be sold with either a single, or several cutting boards 15 that posses similar widths yet different lengths. In this way, a user could select the most convenient sized board for the desired purpose, adjusting the slidable support elements 13, 14 to fit the appropriate cutting board 15 size. The user may desire a larger or smaller cutting surface 23 depending on the size or situation of the object to be cut. However, it is still necessary that the largest sized cutting board 15 has a smaller surface area than the open pan interior 35. In this way, the cutting board may still rest on the support elements 13, 14 and be able to provide a gap between the edges 17, 18, 19, 20 of the cutting board 15 and the outer edge 37 of the retaining pan 11.

The method of using the cutting board assembly of the present invention in order to filet a fish will be briefly described in terms of the following steps. Once the above mentioned apparatus has been provided, the support elements 13, 14 are attached to the retaining pan 11 by clipping the support element flanges 47, 48, 49, 50 over the peripheral lip 39 of the retaining pan 11. This is accomplished by applying downward pressure to the support elements 13, 14 after the flanges 47, 48, 49, 50 are placed directly over the peripheral lip 39 of the retaining pan 11. Once both ends 41, 42 and 43, 44 of each support element 13, 14 are positively engaged to the retaining pan 11, the support elements 13, 14 may be slidably adjusted to appropriately fit the size of the cutting board 15. Next, the cutting board 15 is placed on the support elements 13, 14 and secured to the pan 11. The support elements may be moved slightly to more securely engage the cutting board. A gap is created between the cutting board peripheral edges 17, 18, 19, 20 and the pan edges 37. The gap may be varied by sliding the cutting board 15 to a different relative position on the pan edge 37, if desired.

Once the assembly of the cutting board and pan is complete, the user may place a fish or other object on the upper surface 23 of the cutting board (see FIG. 5) and proceed to dress and filet the fish and allow the fluids which are discharged to flow over the cutting board edges 17, 18, 19, 20 and through the gap to the pan interior 35.

Figure 7:
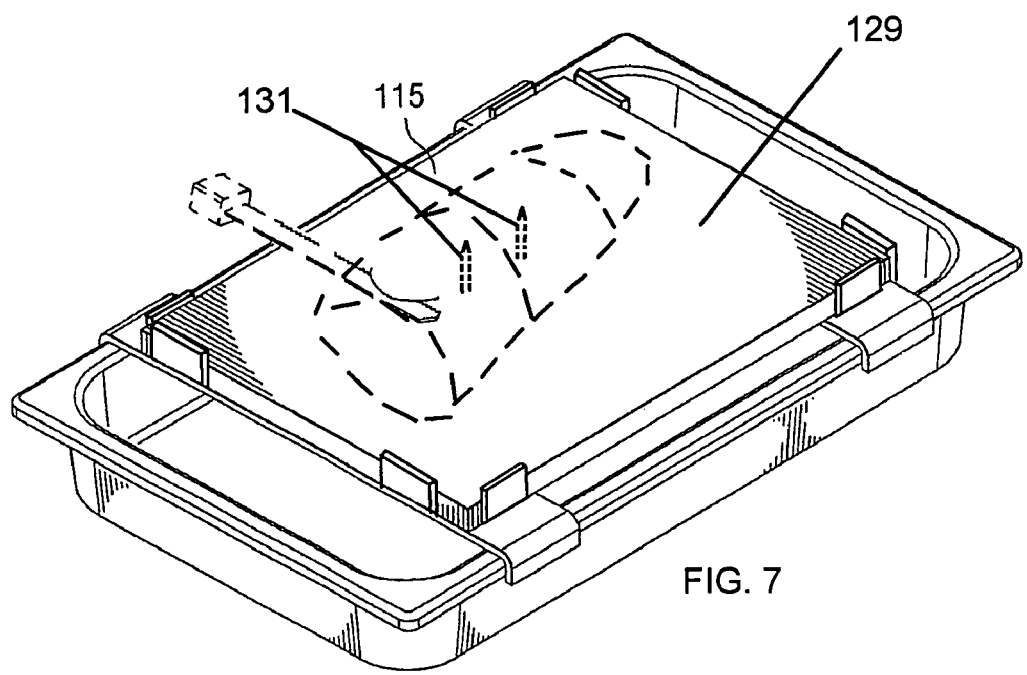
FIG. 7 is a perspective view of the retaining pan and cutting board assembly, including the protruding upright elements, showing an impaled portion of a roast being cut, the roast and knife being shown in phantom.

FIGS. 6 and 7 provide an illustration of the alternative embodiment of the invention, wherein the foodstuff (shown in phantom) may be placed upon the protruding upright elements 131 and secured to the upper planar surface 129 of the cutting board 115. Once the dressing and filet process is complete, the cutting board assembly can be easily cleaned. Upon the removal of the board 15 from the support elements, it is ready to be washed in the appropriate manner. Next, the support elements 13, 14 may be removed from the peripheral edge of the pan and washed. The waste materials which have collected in the retaining pan 11 may be disposed of in whatever manner the user sees fit, and then the pan can then also be washed.

The support elements 13, 14 provide a number of versatile variations in the cutting board arrangement. For example, it may be desirable to use the support elements with a much larger cutting board. This would usually be the case for use with larger fish, such as salt water varieties. In this case, the downwardly extending flanges 47, 48, 49, 50 of the support elements 13, 14 could be made longer to extend down a greater distance, with holes drilled so that the support elements could be screwed to, for example, a 4×4 wooden post which would be horizontally attached to the cleaning table.

An invention has been provided with several advantages. The cutting board assembly provides a secure and convenient location to dress and filet a fish or accomplish other kitchen chores, with a retaining pan to efficiently collect waste by-products during the process. The cutting board assembly is made of readily available materials and components and is of extremely sturdy design. In addition, the components are separable and easily cleaned. The cutting board assembly is ideal to use in the kitchen or can be easily transported for use on a boat, camping expedition, or the like.

Figure 5:
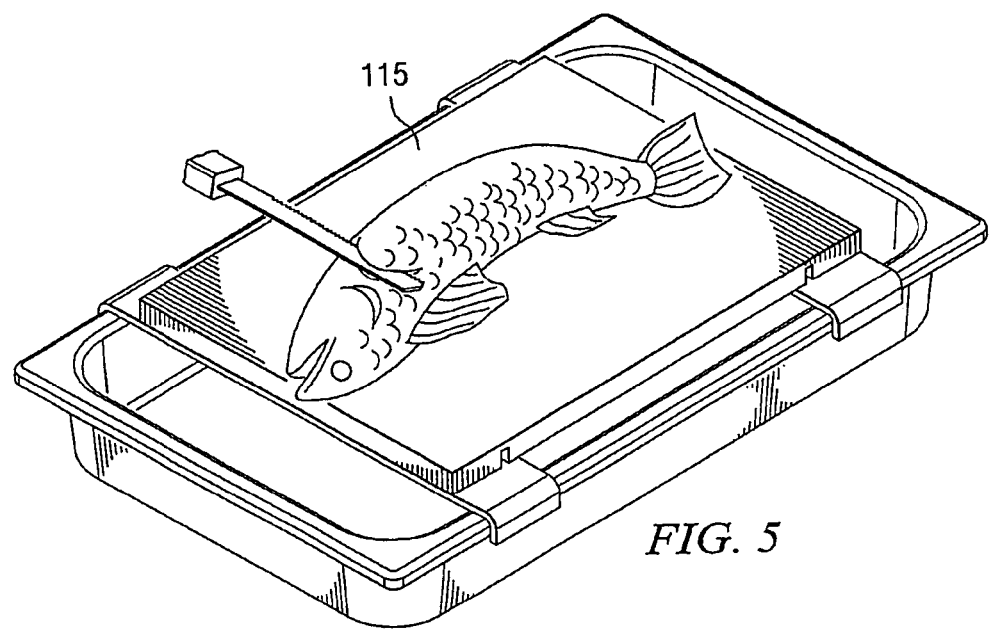
FIG. 5 is a perspective view of the retaining pan and cutting board assembly showing a fish being filleted with an electric filet knife.

As can be seen in FIG. 5, the cutting board assembly is ideally suited for use with an electric fish filet knife, since it provides a raised cutting surface some 2-3 inches above the table top which is sturdy and which does not slide about during use.

The cutting board can be used to cut a variety of food items, in addition to fish, such as vegetables, fruits or other meats. The cutting surface acts as a standard cutting board, with the additional convenience of the retaining pan to hold the finished cuttings. For example, several vegetables may be cut on the same board, all the while sliding the finished cuttings into the retaining pan until all vegetables have been cut for a final outcome of a ready to eat salad remaining in the retaining pan. Similarly, food products such as lemons, limes, oranges, or grapefruit may be easily sliced on the cutting board whereby the fluids discharged from the fruit would be collected in the retaining pan, either for easy disposability or later consumption.

While the invention has been shown in only two of its forms, it is not thus limited, but is susceptible to various changes and modifications without departing from the spirit thereof.

What is claimed is:

1. A cutting board assembly, comprising:

a retaining pan having a bottom wall and associated upright retaining walls extending upwardly generally perpendicular thereto to define an initially open interior, the upright retaining walls forming a continuous outer edge which terminates in a downwardly extending peripheral lip;

a first support element having a length, a width, and opposing ends, the first support element terminating at either end thereof in a downwardly extending flange, the flange being sized to be matingly engage the downwardly extending peripheral lip of the retaining pan to thereby secure the support element on the outer edge of the pan;

a second support element also having a length, a width, and opposing ends, the second support element also terminating at either end thereof in a downwardly extending flange which is also sized to matingly engage the downwardly extending peripheral lip on the retaining pan;

at least a selected one of the first and second support elements being equipped with a retaining element for securely retaining a cutting board thereon, the retaining element comprising an upwardly extending protrusion for engaging a mating groove formed in a lower surface of a cutting board;

a cutting board removably secured to the retaining pan upright retaining walls by the first and second support element, the cutting board being engageable with the selected support element by sliding the upwardly extending protrusion along the mating groove in the lower surface of the cutting board, the first and second support elements being engageable at selected locations on the retaining pan lip, whereby the position of the cutting board can be varied with respect to the pan open interior.

2. The cutting board assembly of claim 1, wherein the first and second support elements support a cutting board above the pan open interior but spaced apart from the pan edges to thereby create a gap between the pan edges and the cutting board to allow the draining of fluids from the cutting board to the pan interior.

3. The cutting board assembly of claim 2, wherein the cutting board is formed of a non-corrosive synthetic material having an upper surface, a lower surface and peripheral edges.

4. The cutting board assembly of claim 1, wherein the cutting board is supported above the pan open interior in a generally horizontal plane.

5. The cutting board assembly of claim 1, wherein the support elements are slidable along the edges of the retaining pan to vary the position of the cutting board with respect to the pan.

6. The cutting board assembly of claim 1, wherein the pan and support elements are formed of stainless steel.

7. The cutting board assembly of claim 1, wherein the non-corrosive synthetic material is a synthetic plastic.

8. A cutting board assembly, comprising:

a retaining pan having a bottom wall and associated upright retaining walls extending upwardly generally perpendicular thereto to define an initially open interior, the upright retaining walls forming a continuous outer edge which terminates in a downwardly extending peripheral lip;

a first support element having a length, a width, and opposing ends, the first support element terminating at either end thereof in a downwardly extending flange, the flange being sized to be matingly engage the downwardly extending peripheral lip of the retaining pan to thereby secure the support element on the outer edge of the pan;

a second support element also having a length, a width, and opposing ends, the second support element also terminating at either end thereof in a downwardly extending flange which is also sized to matingly engage the downwardly extending peripheral lip on the retaining pan;

a cutting board having opposed peripheral edges arranged at right angles to define a polygonal upper and lower surface, wherein said polygonal upper and lower surfaces each have a length, a width, and a separating intermediate thickness;

a plurality of pointed upright elements protruding from the polygonal upper surface of the cutting board;

the first and second support elements each being equipped with at least one retaining element for securely retaining the cutting board thereon, first and second support elements being engageable at selected locations on the retaining pan lip, whereby the position of the cutting board can be varied with respect to the pan open interior.

* * * * *